3,507,680
GLASS SUBSTRATE COATED WITH MODIFIED OR NON-MODIFIED ORGANOPOLYSILOXANE
Robert Henry Kiel, Weston, Ohio, assignor to Owens-Illinois, Inc., a corporation of Ohio
No Drawing. Filed Sept. 9, 1966, Ser. No. 578,156
Int. Cl. C03c *17/30;* B41m *1/12;* B44d *1/14*
U.S. Cl. 117—38        5 Claims

ABSTRACT OF THE DISCLOSURE

There is disclosed a glass substrate containing a thin layer of polyoxyethylene monostearate and a decorative organopolysiloxane resin composition applied to at least a portion of the coated surface. In one embodiment the substrate is a high alkali silicate glass such as soda lime. Organopolysiloxane is defined as including both modified and/or non-modified type resins.

---

This invention relates to a novel process of applying an organopolysiloxane resin-based coating composition to a glass surface such as a glass container including bottles, ware, tumblers, and the like. More particularly, this invention relates to a process for coating or decorating a glass surface with an organopolysiloxane composition having increased adhesion and improved resistance to water and caustic solutions and selected organic solvents.

Prior to the discovery of this invention, poor adhesion was obtained when a glass surface was coated with an organopolysiloxane resin-based coating composition, especially when the coating was exposed to humid or wet conditions or when the coated glass surface was soaked in hot caustic solution, for example as in the sterilization of glass bottles.

In accordance with the practice of this invention, a modified or non-modified organopolysiloxane resin-based coating composition is applied to a glass surface in the presence of polyoxyethylene monostearate, and stearate being present in an amount sufficient to substantially increase the permanency of adhesion of the resin coating to the glass.

In accordance with a specific embodiment of this invention, a glass surface is first coated or primed with a thin layer of the stearate at a temperature below the decomposition temperature of the stearate, e.g. below about 300° F. The resin-based coating composition is then applied to at least a portion of the primed surface.

Polyoxyethylene monostearate is a monostearate ester of a condensation polymer having the formula:

(I)         $H(OCH_2CH_2)_nOCOC_{17}H_{35}$ where *n* is approximately 40. For the physical and chemical properties of polyoxyethylene monostearate, reference is made to the Condensed Chemical Dictionary, Sixth Edition, published by Reinhold Publishing Co., New York, N.Y., (1961), pages 916, 917 and Product Information Bulletin 2–57R6–62/300 published by Atlas Chemical Industries.

Polyoxyethylene monostearate has a specific gravity of about 1.1 at 25° C., a flash temperature of about 505° F., a saponification number of about 25 to 35, an acid number of 0 to 1, a hydroxyl number of 25 to 37, and is a light tan, waxy granular solid at 25° C.

It is contemplated applying the polyoxyethylene monostearate to any suitable glass surface including an article of manufacture such as a bottle, jar, tumbler, or other container as well as sheet glass.

Suitably the article is treated with the monostearate after the article leaves a glass forming machine and after the article has been cooled to less than about 300° F., e.g. by passing through an annealing lehr.

Since polyoxyethylene stearate is a solid substance at ambient temperatures, it is dissolved or dispersed in water or a suitable organic solvent or vehicle and applied as an aqueous or organic coating composition.

Although a wide range of coating compositions may be used, it is particularly suitable to employ coating compositions or media containing solvents or vehicles in which the monostearate is soluble such as water, toluol, acetone, ether, dioxane, Cellosolve, carbon tetrachloride, methanol, ethanol, ethyl acetate, aniline, and mixtures thereof. Aqueous media are especially suitable.

The preferred vehicle for application of the coating is distilled water although it is to be understood that no criticality is attached thereto and other solvents, such as alcohols or ordinary water, may be used. Distilled water is recommended because impurities are kept out of the coating and there is less chance for undesirable chemical reactions to take place between the impurities and the coating ingredients. Moreover, with the use of distilled water, less maintenance on equipment is needed since the solvent is a major constituent of the mixture. As between water and organic solvents, the use of water in general is less hazardous to plant personnel than is the use of a more volatile solvent such as alcohol. In addition, organic solvents are more expensive than water, and, accordingly, from an economic standpoint water is the preferred solvent.

The proportion of the polyoxyethylene monostearate in the coating composition or medium may vary over a relatively wide range, the principal criterion for choosing relative proportions being a consideration of the practical application systems rather than any chemical criticality.

Typically the polyoxyethylene monostearate is dissolved or dispersed in an aqueous or organic medium in an amount ranging from about .05 to .5, preferably about .1 to .3, percent by weight monostearate based on the total weight of the solution or slurry.

The resulting coating composition is then applied to the glass surface at a temperature below about 300° F., preferably about 175 to 225° F., in an amount sufficient to provide up to about 5 milligrams, preferably about .5 to 1.5 milligrams, of monostearate per 40 square inches of glass surface.

The coating composition can be applied to the glass surface by any suitable means such as a traversing spray nozzle at varying spray rates.

Where the glass article is cooled by passing through an annealing lehr on a belt, the spraying is done near the cold end of the lehr when the article is at a temperature of about 100° F. to about 300° F., preferably about 175° F. to 225° F. The coating composition, e.g. comprising an aqueous polyoxyethylene monostearate mixture, is sprayed at a rate of about 0.5 to about 5.0 quarts of mixture per 100 square feet of the lehr belt. The treated or primed article is then coated or decorated with the organopolysiloxane resin.

In the practice of this invention, it is contemplated using either a solid or liquid organopolysiloxane resin.

Organopolysiloxane compounds which are particularly suitable for use in the practice of this invention may be produced by the hydrolysis and condensation of at least one alkoxysilane compound having the formula:

(II)              $T_nSiZ_{(4-n)}$ wherein T independently represents a member selected from alkyl, cycloalkyl, alkenyl, and aryl; Z independently represents an alkoxy group and *n* is 1.

Representative alkyl, cycloalkyl, alkenyl, and aryl members contemplated for T in Formula II are methyl, ethyl, propyl, butyl, pentyl, hexyl, (both normal and isomeric forms), cyclopentyl, cyclohexyl, vinyl, the normal and isomeric forms of propentyl through hexenyl, and phenyl.

Representative alkoxy groups for Z are methoxy through heptoxy.

In accordance with this invention, it is contemplated hydrolyzing and condensing one alkoxysilane as represented by Formula II or a mixture of two or more such alkoxysilanes.

It has been discovered in the practice of this invention that preferred results are obtained with the methyltrialkoxysilanes (where T is methyl in Formula II). Such methyltrialkoxysilanes may be used alone as disclosed in copending U.S. patent application Ser. No. 370,684 filed May 27, 1964 by Burzynski and Martin and now abandoned or in conjunction with other alkoxysilanes, especially the phenyltrialkoxysilanes as disclosed in copending U.S. patent application Ser. No. 306,344, filed Sept. 3, 1964 by Burzynski and Martin and now abandoned.

The methyltrialkoxysilanes and phenyltrialkoxysilanes contemplated herein include compounds of the formulae $CH_3Si(OR)_3$ and $C_6H_5Si(OR)_3$, wherein R represents a monovalent alkyl radical of less than five (i.e. 1–4) carbon atoms. Examples of such methyltrialkoxysilanes are methyltrimethoxysilane, methyltriethoxysilane, methyltri(1-propoxy)silane, methyltri(2-propoxy)silane, methyltri(2-methyl-2-propoxy)silane, methyltri(1-butoxy)silane, and methyltri(2-butoxy)silane; examples of phenyltrialkoxysilanes are phenyltrimethoxysilanes, phenyltriethoxysilane, phenyltri(1-propoxy)silane, phenyltri(2-propoxy)silane, phenyltri(2-methyl-2-propoxy)silane, phenyltri(1-butoxy)silane, and phenyltri(2-butoxy)silane.

It is further contemplated that there may be used a mixture of trifunctional alkoxysilanes as represented by Formula II and up to 5 mole percent, based on the total silane reactants, of mono or difunctional alkoxysilanes (where $n$ equals 2 or 3 in Formula II) as disclosed in said copending U.S. patent applications 370,684 and 306,344.

Specific examples of mono and difunctional alkoxysilanes (where $n$ equals 2 or 3 in Formula II) include trimethylmethoxysilane, tri(1-methylethyl)ethoxysilane, di(1-methylpropyl)diethoxysilane, divinyldipropoxysilane, diphenyldiethoxysilane, propylpentylmethoxyethoxysilane, methylallyldi(1-methylethoxy)silane, vinylphenyldimethoxysilane, ethyltriethoxysilane, (1-methylethyl)trimethoxysilane, (1,1-dimethylethyl)tripropoxysilane, hexyltriethoxysilane, and vinyltriethoxysilane.

Also in accordance with the practice of this invention, the organopolysiloxane resin-based coating composition may comprise compatible pigments, dyes, fillers, wetting agents, and dispersing agents in addition to the organopolysiloxane resin. Such pigments, dyes, fillers, wetting agents, and dispersing agents are typically incorporated into the composition prior to the completion of the polymerization of the alkoxysilane; that is, before the complete conversion of the alkoxysilane(s) to the organopolysiloxane resin.

The actual polymerization conditions, for example temperature and concentration, will depend upon the particular alkoxysilane(s) used as the base starting material and the type of organopolysiloxane resin required. Reference is made to U.S. Re. Patent 23,060, U.S. Patents 2,456,783 and 2,397,895, and M. M. Sprung and F. O. Guenther, J. Am. Chem. Soc., 77, 4173, 6045 (1955) for procedures suitable to convert alkoxysilanes, especially methyltrialkoxysilanes, as comonomers with other alkoxysilanes to a variety of non-transparent but useful liquid and solid organopolysiloxane resins.

In a further embodiment of this invention, the glass surface is coated or decorated with a transparent organopolysiloxane resin-based coating composition. Procedures for preparing such transparent resins are disclosed in copending U.S. applications 370,684 and 306,344, supra, and copending U.S. application Ser. No. 545,579, filed Apr. 27, 1966 by Burzynski and Martin, and now Patent 3,395,117 which procedures are incorporated herein by reference.

Organopolysiloxane coatings which have been applied to a glass surface in accordance with this invention typically retain adhesion to the surface even when soaked for 10 minutes in a hot caustic solution, e.g. a three (3) percent by weight aqueous solution of NaOH at 160° F. Organopolysiloxane coatings not applied in accordance with this invention exhibit total failure of adhesion under the same test conditions.

In the practice of this invention best resuls have been obtained with high alkali silicate glass such as soda line glass used in the manufacture of glass bottles.

The hereinafter example represents the best mode contemplated by the inventor in the practice of this invention.

EXAMPLE

A number of glass bottles were formed from a soda lime glass having a composition of about 71.54 percent by weight $SiO_2$, 1.41 percent by weight $Al_2O_3$, 11.1 percent by weight CaO, 2.70 percent by weight MgO, and 13.23 percent by weight $K_2O$ and $Na_2O$.

The bottles were cooled to about 200° F. by passing through an annealing lehr. The cooled bottles were then sprayed with an aqueous organic coating composition containing .17 percent by weight polyoxyethylene monostearate dissolved in distilled water. The composition was sprayed at the rate of about one quart of mixture per 100 square feet of lehr belt; that is, sufficient solution to provide about .5 to 1.5 milligrams of monostearate per 40 square inches of glass surface.

The primed bottles were then decorated with an organopolysiloxane resin-based coating composition using a hot melt silk screen process as described in copending U.S. Patent application Ser. No. 534,518, filed Mar. 15, 1966.

The organopolysiloxane resin-based coating composition was initially prepared by melting at about 240° F. one hundred (100) grams of biphenyl and one hundred (100) grams of a heat-softenable organopolysiloxane resin powder (prepared in accordance with the procedure of Example VIII in copending U.S. application Ser. No. 545,579, filed Apr. 27, 1966). One hundred (100) grams of rutile $TiO_2$ was stirred into the hot melt and the resulting mixture passed over a three-roll mill at about 300° F.

The coated bottles were then heated at about 500° F. in an oven for six (6) minutes to cure the organopolysiloxane resin.

After curing of the resin, the bottles were cooled to ambient temperature. The crued resin-coating was found to be highly resistant to washing with methyl ethyl ketone.

The coating was further tested by soaking in three (3) percent by weight aqueous NaOH at 160° F. for about 10 minutes. The coating was then tested by means of an adhesive tape (Scotch tape—registered trademark) applied to the coated glass bottle surface. The coating adhered permanently to each bottle surface with only a small portion of the coating being detectable on the applied adhesive tape.

For comparison soda lime bottles (not primed with polyoxyethylene monostearate) were coated with the same coating composition. The bottles were tested using the caustic soak test. The coating on these bottles exhibited total failure.

Although this invention has been found to be particularly suitable for coating the surface of soda lime glass typically used in the manufacture of containers such as glass bottles, it also is suitable for coating the surface of other glass compositions. Accordingly, although the invention has been illustrated with reference to specific embodiments it will be obvious to those skilled in the art

I claim:

1. An article of manufacture comprising in combination a glass substrate having at least one surface thereof coated with a thin layer of polyoxethylene monostearate and a decorative organopolysiloxane resin composition applied to at least a portion of the coated surface.

2. The article of claim 1 wherein the surface contains up to about 5 milligrams of monostearate per 40 square inches of glass surface.

3. The article of claim 1 wherein the surface contains about .5 to about 1.5 milligrams of monostearate per 40 square inches of glass surface.

4. The article of claim 1 wherein the substrate is a high alkali silicate glass.

5. The article of claim 4 wherein the substrate is a soda lime glass.

References Cited

UNITED STATES PATENTS

| | | | |
|---|---|---|---|
| 3,042,544 | 7/1962 | Marzocch et al. | 117—126 X |
| 3,090,701 | 5/1963 | Shulver et al. | 117—76 |
| 3,102,049 | 8/1963 | Quirk | 117—124 X |
| 3,108,920 | 10/1963 | Lagally | 117—124 X |
| 3,350,337 | 10/1967 | Campbell | 117—126 X |

MURRAY KATZ, Primary Examiner

D. COHEN, Assistant Examiner

U.S. Cl. X.R.

117—72, 124, 45